(12) United States Patent
Lee

(10) Patent No.: US 7,862,130 B2
(45) Date of Patent: Jan. 4, 2011

(54) SOLENOID VALVE FOR BRAKE SYSTEM

(75) Inventor: Chung Jae Lee, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 0 days.

(21) Appl. No.: 12/495,587

(22) Filed: Jun. 30, 2009

(65) Prior Publication Data

US 2010/0001579 A1    Jan. 7, 2010

(30) Foreign Application Priority Data

Jul. 2, 2008    (KR) ...................... 10-2008-0063778

(51) Int. Cl.
*B60T 8/36*    (2006.01)
(52) U.S. Cl. ............................... 303/119.2; 251/129.02
(58) Field of Classification Search ... 303/119.1–119.2; 251/129.02–129.15
See application file for complete search history.

(56) References Cited

U.S. PATENT DOCUMENTS

| | | | |
|---|---|---|---|
| 6,254,199 B1 | 7/2001 | Megerle et al. ........... | 303/119.2 |
| 6,345,870 B1 * | 2/2002 | Linkner et al. ........... | 303/119.2 |
| 6,644,623 B1 * | 11/2003 | Voss et al. ............. | 251/129.15 |
| 6,994,406 B1 * | 2/2006 | Krawczyk et al. ........ | 303/119.2 |
| 2003/0038536 A1 * | 2/2003 | Cheong ................... | 303/119.2 |
| 2007/0296270 A1 * | 12/2007 | Park ........................ | 303/119.2 |

FOREIGN PATENT DOCUMENTS

WO    01-00473 A1    1/2001

\* cited by examiner

*Primary Examiner*—Christopher P Schwartz
(74) *Attorney, Agent, or Firm*—McDermott Will & Emery LLP

(57) ABSTRACT

Disclosed herein is a solenoid valve for a brake system to reduce manufacturing costs via a shorter length and more simplified configuration of a magnet core. In the solenoid valve for a brake system to be mounted in a bore of a modulator block having an inlet and an outlet, the solenoid valve includes a magnet core having a center longitudinal penetrating hole and an entrance and exit for oil flow, an armature movably provided at one end of the magnet core and serving to open or close the exit, a valve seat provided at the other end of the magnet core, and a sleeve in which the armature and magnet core are received, the sleeve being fixed to the bore.

4 Claims, 2 Drawing Sheets

US 7,862,130 B2

SOLENOID VALVE FOR BRAKE SYSTEM

CROSS-REFERENCE TO RELATED APPLICATION

This application claims the benefit of Korean Patent Application No. 2008-0063778, filed on Jul. 2, 2008 in the Korean Intellectual Property Office, the disclosure of which is incorporated herein by reference.

BACKGROUND

1. Field

Embodiments of the present invention relate to a solenoid valve for a brake system to assure easier manufacture and lower manufacturing costs than the related art.

2. Description of the Related Art

A general vehicular anti-lock brake system is designed to prevent wheel lockup when braking hard by controlling braking pressure applied to wheels based on sensed tire slip.

This assures directional stability and steering control of wheels without tire slip during braking and consequently, safe braking.

This type of brake system includes a plurality of solenoid valves that opens or closes flow-paths of brake hydraulic lines to control braking pressure. Solenoid valves may be classified into normally opened type solenoid valves that are normally kept in an opened state, and normally closed type solenoid valves that are normally kept in a closed state.

FIG. 1 is a sectional view illustrating a conventional normally opened type solenoid valve for a brake system.

Referring to FIG. 1, the conventional normally opened type solenoid valve (hereinafter, referred to as a solenoid valve) is installed in a modulator block 1 for enhanced integration. For installation of the valve, a valve bore 2 is cut in the modulator block 1.

The valve bore 2 is connected to an inner flow-path formed in the modulator block 1, and a magnet core 3 is inserted into the valve bore 2.

A cylindrical sleeve 5 is coupled to one end of the magnet core 3 and in turn, an armature 4 is movably received in an interior hollow of the cylindrical sleeve 5. A plunger 7 is integrally formed at one end of the armature 4, to allow the armature 4 to open or close an orifice 6a of a valve seat 6 via movement thereof. An elastic member 9 is interposed between the plunger 7 and the valve seat 6.

A lower portion of the magnet core 3, in which the valve seat 6 is axially received, is inserted in the bore 2 with a predetermined clearance from an inner periphery of the bore 2. A lip seal 8 is fitted around the lower portion of the magnet core 3. The lip seal 8 is made of elastic material and functions as a check valve.

The lip seal 8 takes the form of a loop that is provided at an edge thereof with an elastic piece. To install the lip seal 8, an annular seating recess 3a is formed in an outer periphery of the magnet core 3 near a lower end thereof. If braking pressure is applied to the lip seal 8, the elastic piece of the lip seal 8 spreads out in a radial direction, thus coming into close contact with the inner periphery of the bore. Thereby, the braking pressure is transmitted to a brake through the orifice 6a and an outlet 10 of the modulator block. On the other hand, the elastic piece is retracted toward the center by hydraulic pressure upon release of the braking pressure, thus being spaced apart from the inner periphery of the bore 2 to create a pressure-release flow-path. This may cause the braking pressure to be partially transmitted to a master cylinder through an inlet.

However, in the above-described conventional solenoid valve for a brake system, the plunger and valve seat are mounted in the magnet core and also, the lip seal is mounted around the magnet core. Therefore, inserting the magnet core into the bore may require an excessively long length and complex configuration of the magnet core, resulting in higher production price.

Further, the sleeve is press-fitted around an upper portion of the magnet core and is fixed thereto by welding. This fixing configuration however may increase assembly costs.

Furthermore, when the armature opens or closes the orifice of the valve seat by movement of the plunger, reduction of manufacturing costs is limited.

SUMMARY

Therefore, it is an aspect of the present invention to provide a solenoid valve for a brake system, to reduce manufacturing costs via a shorter length and more simplified configuration of a magnet core.

It is another aspect of the present invention to provide a solenoid valve for a brake system having an improved assembly configuration of a magnet core and sleeve.

It is a further aspect of the present invention to provide a solenoid valve for a brake system to reduce manufacturing costs through omission of a plunger.

Additional aspects of the invention will be set forth in part in the description which follows and, in part, will be obvious from the description, or may be learned by practice of the invention.

In accordance with one aspect of the present invention, a solenoid valve for a brake system, to be mounted in a bore of a modulator block having an inlet and an outlet, includes a magnet core having a center longitudinal penetrating hole and an entrance and exit for oil flow, an armature movably provided at one end of the magnet core and serving to open or close the exit, a valve seat provided at the other end of the magnet core, and a sleeve in which the armature and magnet core are received, the sleeve being fixed to the bore.

The valve seat may be an integral member including an orifice portion inserted into the penetrating hole, a stopper provided around the orifice portion to prevent excessive insertion of the orifice portion, and a bypass hole to communicate the inlet and the outlet with each other, and the bypass hole may be provided with a ball, to function as a check valve.

The inlet may contain an inlet filter member, and the inlet filter member may be inserted into and fixed to an end of the valve seat.

A flow-path may be defined between an outer periphery of the magnet core and the sleeve, to communicate the exit and the outlet with each other.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
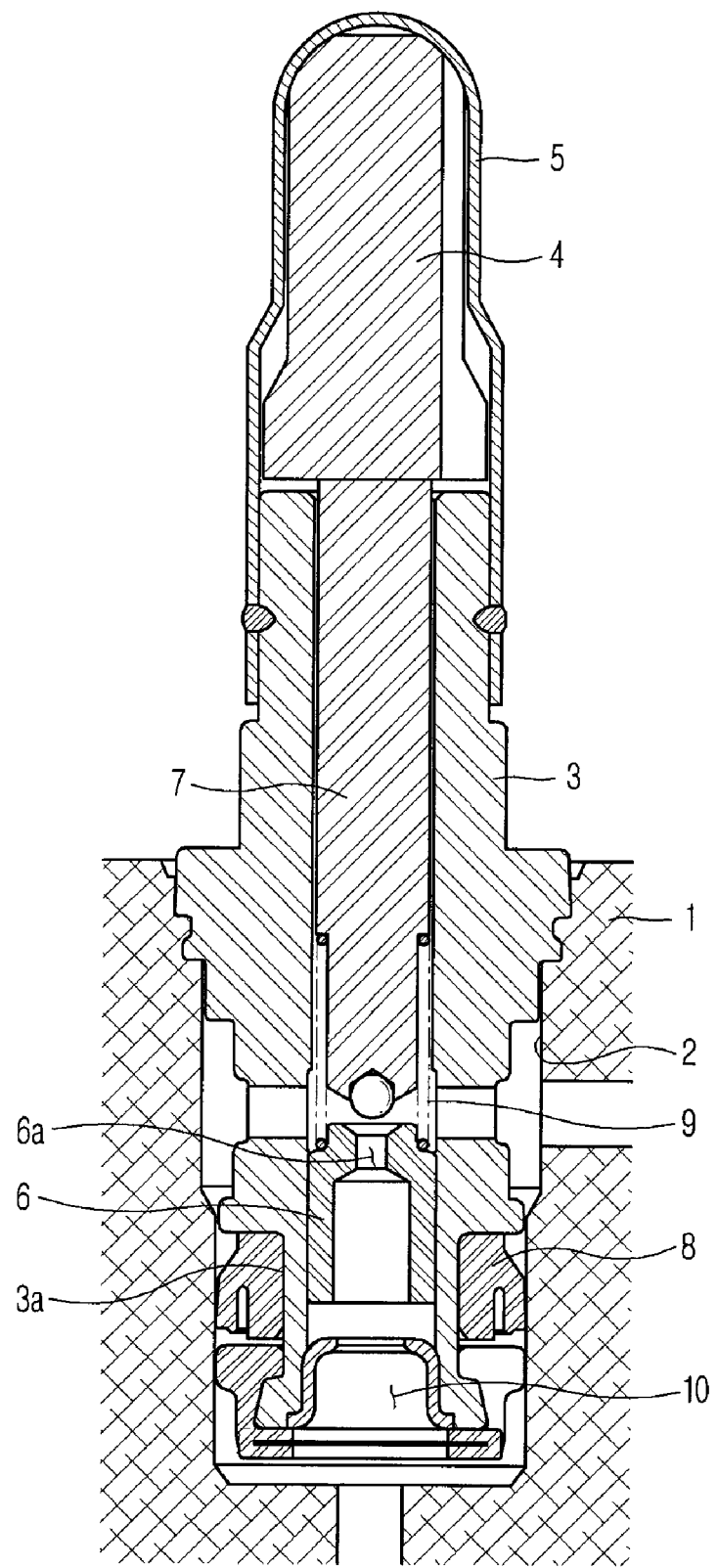
FIG. 1 is a sectional view illustrating a configuration of a conventional solenoid valve for a brake system.

Reference will now be made in detail to the embodiment of the present invention, examples of which are illustrated in the accompanying drawings, wherein like reference numerals refer to like elements throughout.

Figure 2:
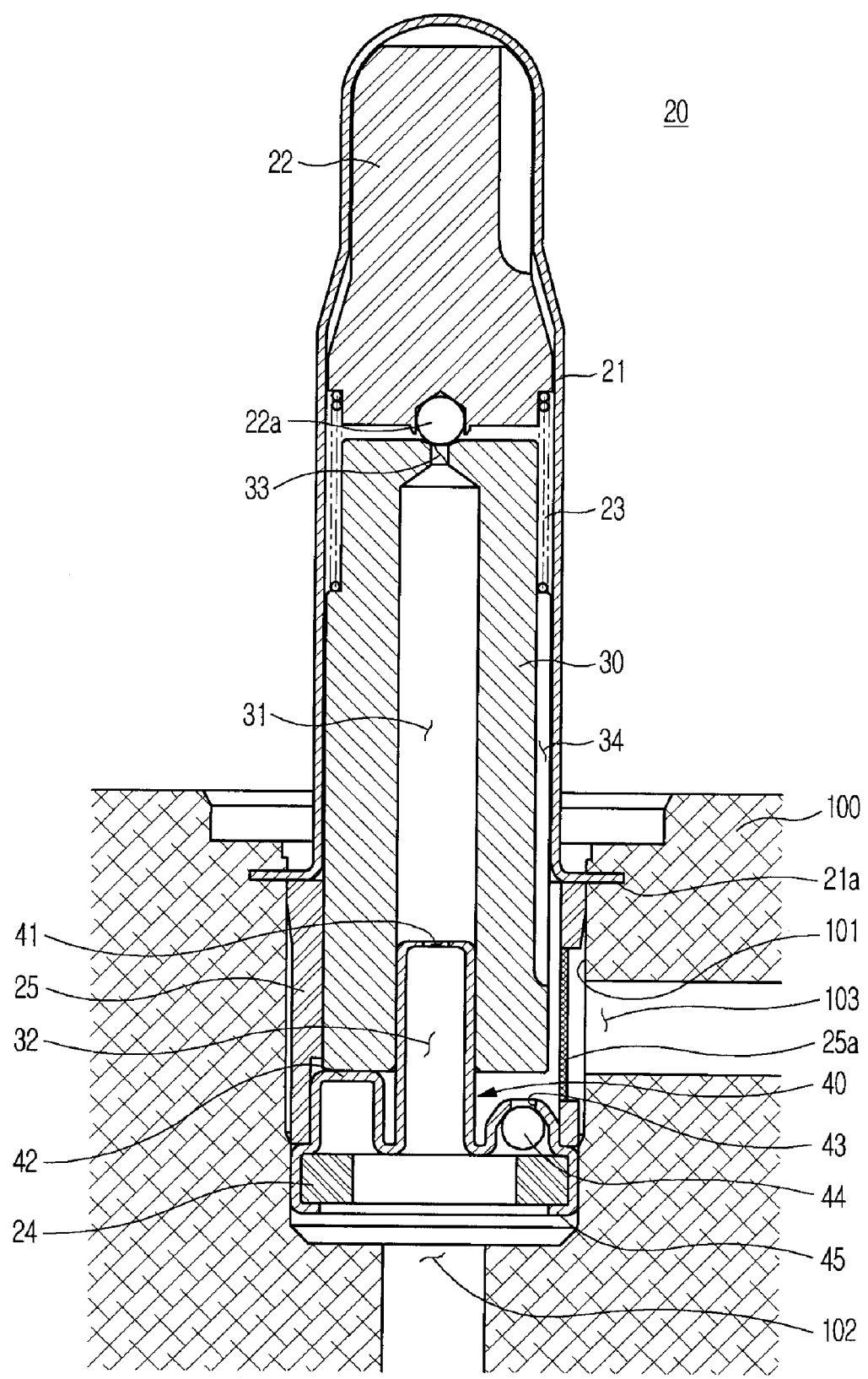
FIG. 2 is a sectional view illustrating a configuration of a solenoid valve for a brake system according to an embodiment of the present invention.

Referring to FIG. 2, a valve 20 for a brake system according to the present embodiment is installed in a bore 101 formed in a modulator block 100 in the form of a hexahedral block. An inlet 102 is provided below the bore 101 and is connected to a master cylinder (not shown) to receive oil from the master cylinder. Also, an outlet 103 is provided at a side of the bore 101 and is connected to a brake (not shown) to transmit the oil to the brake.

In the present embodiment, the shown valve 20 is a normally opened type solenoid valve and thus, is normally kept in an opened state but closes a flow-path upon receiving power.

The valve 20 includes a cylindrical sleeve 21 having an inner hollow, an armature 22 movably received in the sleeve 21, a magnet core 30 received in the sleeve 21 at a position below the armature 22, and a valve seat 40 provided at a lower end of the magnet core 30.

The magnet core 30 has a center penetrating hole 31. A lower end of the penetrating hole 31 defines an entrance 32, through which the oil is introduced into the valve 20. An upper end of the penetrating hole 31 defines an exit 33, through which the oil is supplied to the outlet 103 of the modulator block 100.

A flow-path 34 is defined in a predetermined region between an outer peripheral surface of the magnet core 30 and the sleeve 21. The flow-path 34 serves to guide the oil discharged from the exit 33 to the outlet 103 of the modulator block 100.

The armature 22 received in the sleeve 21 is vertically movable by magnetic force and is provided at a lower end thereof with an opening/closing ball 22a to open or close the exit 33 of the magnet core 30.

Accordingly, the armature 22 may directly open or close the exit 33 and this enables omission of a plunger that is included in a conventional solenoid valve.

An elastic spring 23 is interposed between the armature 22 and the magnet core 30. The armature 22 and magnet core 30 are normally spaced apart from each other by elasticity of the elastic spring 23, thus allowing the exit 33 to be kept in an opened state.

The sleeve 21 is fixedly fitted into the bore 101 of the modulator block 100 and in turn, the armature 22 and magnet core 30 are received in the sleeve 21. A flange 21a is formed at a lower end of the sleeve 21. Thus, as the flange 21a is inserted into and fixed to the bore 101, the sleeve 21 may be firmly mounted.

Accordingly, a process of welding a sleeve to an outer peripheral surface of a magnet core as in the related art may be omitted, resulting in enhanced assembly efficiency.

The valve seat 40 is an integral member, and includes an orifice portion 41 inserted into the penetrating hole 31, a stopper 42 provided around the orifice portion 41 to prevent excessive insertion of the orifice portion 41, and a bypass hole 43 to communicate the inlet 102 and outlet 103 with each other.

The orifice portion 41 is inserted into the penetrating hole 31 and serves to transmit the oil to the exit 33. An outer diameter of the orifice portion 41 is approximately equal to an inner diameter of the penetrating hole 31.

The stopper 42 is formed in a radial direction around a lower portion of the orifice portion 41 and serves to prevent excessive insertion of the orifice portion 41. An upper surface of the stopper 42 comes into contact with a lower end surface of the magnet core 30, to support the magnet core 30.

The bypass hole 43 of the valve seat 40 allows the oil to flow between the inlet 102 and the outlet 103 without passing through the penetrating hole 31 of the magnet core 30. A ball 44 is provided adjacent to the bypass hole 43, to open or close the bypass hole 43.

An inlet filter member 24 is fixedly coupled to a lower end of the valve seat 40. For this, after the inlet filter member 24 is inserted into the valve seat 40, a lower end portion 45 of the valve seat 40 is bent inward. Thus, the valve seat 40 and inlet filter member 24 may be formed integrally with each other and also, may define a movement space for the ball 44 that opens or closes the bypass hole 43, thus preventing separation of the ball 44.

The above-described valve seat 40 is press-fitted to an inner surface of the bore 101 for sealing.

A combination of the bypass hole 43 and ball 44 functions as a check valve. During braking, the ball 44 is raised by the oil from the inlet 102 to close the bypass hole 43, thus allowing the oil to be transmitted to the brake (not shown) only through the penetrating hole 31 of the magnet core 30. On the other hand, upon release of braking, the ball 44 is lowered by the oil from the outlet 103 to open the bypass hole 43. Thus, a part of the oil may directly flow from the outlet 103 to the inlet 102, rather than passing through the penetrating hole 31 of the magnet core 30, to release pressure of the outlet 103.

An outlet filter member 25 surrounds an outer peripheral surface of the magnet core 30 near a lower end thereof and also, surrounds an outer peripheral surface of the valve seat 40. The outlet filter member 25 has a filter 25a formed at a portion thereof corresponding to the outlet 103. An upper end of the outlet filter member 25 is supported by the flange 21a of the sleeve 21, and a lower end is supported by a stepped portion of the valve seat 40.

Now, operation of the above-described solenoid valve will be described.

If a driver operates a brake pedal (not shown), braking hydraulic pressure created in the master cylinder is transmitted to the brake via the solenoid valve 20.

The solenoid valve 20 is normally kept in an opened state and therefore, braking oil flows from the inlet 102 to the outlet 103 by way of the orifice portion 41, exit 33, flow-path 34 and filter member 25a.

Then, if the driver releases the brake pedal, the braking oil flows to the inlet 102 in reverse. In this case, a part of the braking oil directly flows from the outlet 103 to the inlet 102 through the bypass hole 43.

As is apparent from the above description, in a solenoid valve according to the embodiment of the present invention, an armature may directly open or close an exit via movement thereof without requiring a separate opening/closing member such as a plunger, resulting in reduction of manufacturing costs.

Further, by fixing a sleeve to a bore of a modulator block rather than welding the sleeve to a magnet core, the entire manufacturing process may be simplified.

Furthermore, providing a valve seat with a bypass hole and a ball and also, coupling the sleeve to the bore of the modulator block may result in a more simplified configuration of the magnet core.

Although the embodiment of the present invention has been shown and described, it would be appreciated by those skilled in the art that changes may be made in these embodiments without departing from the principles and spirit of the invention, the scope of which is defined in the claims and their equivalents.

What is claimed is:

1. A solenoid valve for a brake system, to be mounted in a bore of a modulator block having an inlet and an outlet, the solenoid valve comprising:
   a magnet core having a center longitudinal penetrating hole and an entrance and exit for oil flow;
   an armature movably provided at one end of the magnet core and serving to open or close the exit;
   a valve seat provided at the other end of the magnet core; and
   a sleeve in which the armature and magnet core are received, the sleeve being fixed to the bore,
   wherein the valve seat is an integral member, and includes an orifice portion inserted into the penetrating hole, a stopper provided around the orifice portion to prevent excessive insertion of the orifice portion, and a bypass hole to communicate the inlet and outlet with each other, the valve seat press-fitted to an inner surface of the bore for sealing.

2. The solenoid valve according to claim 1, wherein the bypass hole is provided with a ball, to function as a check valve.

3. The solenoid valve according to claim 1, wherein the inlet contains an inlet filter member, and the inlet filter member is inserted into and fixed to an end of the valve seat.

4. The solenoid valve according to claim 1, wherein a flow-path is defined between an outer periphery of the magnet core and the sleeve, to communicate the exit and the outlet with each other.

* * * * *